Dec. 30, 1924. 1,520,758
G. S. LANE
VEHICLE BRAKE DEVICE
Filed Nov. 23, 1921
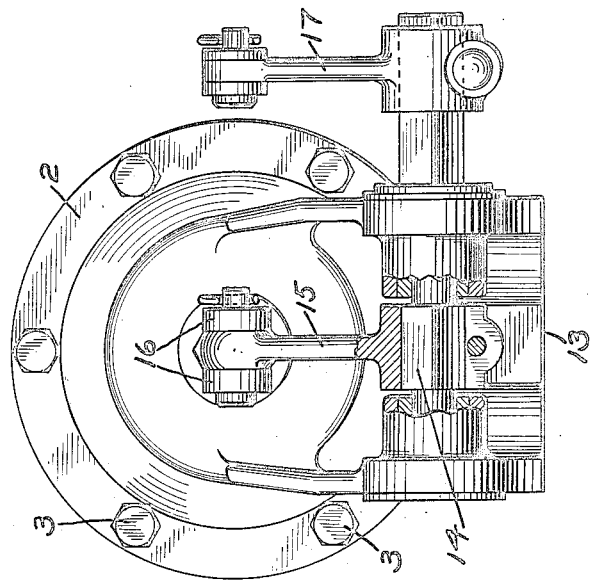
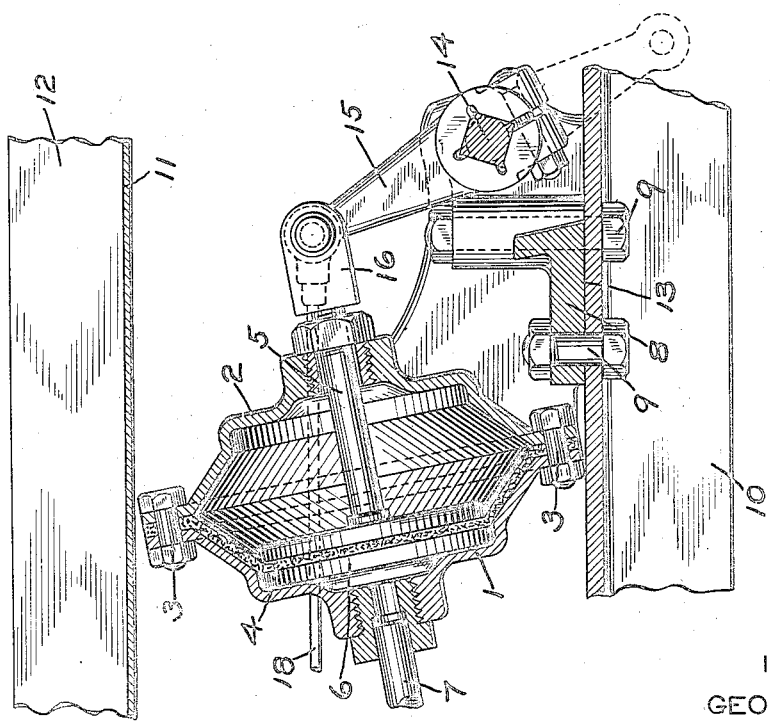
INVENTOR
GEORGE S. LANE
BY
ATTORNEY Patented Dec. 30, 1924.

1,520,758

UNITED STATES PATENT OFFICE.

GEORGE S. LANE, OF SAN FRANCISCO, CALIFORNIA, ASSIGNOR TO THE WESTINGHOUSE AIR BRAKE COMPANY, OF WILMERDING, PENNSYLVANIA, A CORPORATION OF PENNSYLVANIA.

VEHICLE BRAKE DEVICE.

Application filed November 23, 1921. Serial No. 517,210.

*To all whom it may concern:*

Be it known that I, GEORGE S. LANE, a citizen of the United States, residing at San Francisco, in the county of San Francisco and State of California, have invented new and useful Improvements in Vehicle Brake Devices, of which the following is a specification.

This invention relates to fluid pressure brakes, and more particularly to brake apparatus for automotive brakes.

Owing to the great differences in design and construction of the numerous makes of motor vehicles, the application of a fluid pressure brake to a motor vehicle presents difficulties in the matter of providing a standard equipment which may be applied to different types of cars without the necessity for designing a special construction for each car. This is particularly the case with the installation of the brake cylinder and its connection to the brake rod.

The principal object of my invention is to provide a motor vehicle brake cylinder construction which may be generally applied without requiring changes in the construction in order to adapt same to different designs of cars.

In the accompanying drawing; Fig. 1 is a central horizontal sectional view of a brake cylinder construction embodying my invention; and Fig. 2 a face view thereof.

As shown in the drawings, the brake cylinder may be of the diaphragm type comprising a casing formed of two sections 1 and 2 secured together by bolts 3. Within the casing is mounted a flexible diaphragm 4 having centrally secured thereto a rod 5 and having the diaphragm chamber 6 at the opposite side connected to a pipe 7 through which fluid under pressure is supplied to and released from the diaphragm chamber.

Integral with the casing half section 2 is a bracket 8 having suitable bolt holes for bolts 9, by which the bracket is secured to the car, the bracket being shown as bolted to the car frame 10 underneath the usual apron 11 which extends from the body to the running board 12 of the car. The securing face 13 of the bracket 8 is preferably at a slight angle to the axis of the brake cylinder, so as to permit the installation of a brake cylinder of somewhat greater diameter than the space between the body and the running board would otherwise allow.

Mounted in suitable bearings in the bracket 8 is a rock shaft 14 having a squared portion intermediate the bearings and a squared portion extending outwardly from one of the bearings. Secured to the central squared portion of the shaft 14 is an arm 15, the outer end of which is pivotally mounted in a clevis 16 secured to the rod 5.

On the extended squared portion of the shaft 14 and adjustable arm 17 is secured, the outer end of the arm being pivotally connected to the brake rod 18. The arm 17 may be adjused laterally on the shaft 14 to suit different positions of the brake rod 18 and may also be applied in different angular positions, such as the position shown in full lines in Fig. 2 and the position shown in dotted lines in Fig. 1. The arm 17 may be provided in varying lengths, so that an arm suitable for a particular installation may be applied as desired.

Also in some cases, the arm 17 may not be required, since the conditions may be such that the brake rod can be directly connected to the diaphragm rod 5.

Having now described my invention what I claim as new and desire to secure by Letters Patent, is:—

A fluid pressure brake cylinder for motor vehicles comprising a casing, a flexible diaphragm mounted in said casing, a bracket carried by the casing, a rock shaft mounted in said bracket, an arm secured to said shaft and operatively connected to said diaphragm, an adjustable arm adapted to be secured to said shaft in different angular positions, and a brake rod connected to the last mentioned arm.

In testimony whereof I have hereunto set my hand.

GEORGE S. LANE.